United States Patent
Gariepy-Viles

(10) Patent No.: US 7,430,718 B2
(45) Date of Patent: Sep. 30, 2008

(54) CONFIGURABLE INTERFACE FOR TEMPLATE COMPLETION

(75) Inventor: Aimee Gariepy-Viles, Hood River, OR (US)

(73) Assignee: Ensequence, Inc., Portland, OR (US)

( * ) Notice: Subject to any disclaimer, the term of this patent is extended or adjusted under 35 U.S.C. 154(b) by 453 days.

(21) Appl. No.: 11/160,400

(22) Filed: Jun. 22, 2005

(65) Prior Publication Data

US 2006/0053390 A1    Mar. 9, 2006

Related U.S. Application Data

(60) Provisional application No. 60/608,206, filed on Sep. 9, 2004.

(51) Int. Cl.
G06F 15/00 (2006.01)
G06F 13/00 (2006.01)

(52) U.S. Cl. .................................... 715/700; 725/25

(58) Field of Classification Search ................ 715/700, 715/762, 764, 716, 761–763; 725/42, 25
See application file for complete search history.

(56) References Cited

U.S. PATENT DOCUMENTS

| | | | |
|---|---|---|---|
| 6,232,968 B1 | 5/2001 | Alimpich et al. | |
| 6,754,885 B1 | 6/2004 | Dardinski et al. | |
| 2002/0052976 A1 | 5/2002 | Loesch et al. | |
| 2002/0199187 A1* | 12/2002 | Gissin et al. | 725/32 |
| 2004/0003400 A1* | 1/2004 | Carney et al. | 725/42 |

FOREIGN PATENT DOCUMENTS

| | | |
|---|---|---|
| CA | 2 255 021 | 5/2000 |
| WO | WO 02/071212 | 9/2002 |

* cited by examiner

*Primary Examiner*—Cao "Kevin" Nguyen
(74) *Attorney, Agent, or Firm*—Black Lowe & Graham, PLLC

(57) ABSTRACT

Systems, methods and graphical user interfaces for creating interactive television applications are provided. A template author creates a template application and assigns placeholder objects do display elements. An episodic creator creates an episodic application by making changes to display elements associated with a presented placeholder object.

5 Claims, 8 Drawing Sheets

CONFIGURABLE INTERFACE FOR TEMPLATE COMPLETION

CROSS-REFERENCE TO RELATED APPLICATIONS

This application claims the benefit of U.S. Provisional Application Ser. No. 60/608,206 filed Sep. 9, 2004, the contents of which are hereby incorporated by reference.

FIELD OF THE INVENTION

This invention relates generally to user interface systems and, more specifically, to templates for graphical user interfaces.

BACKGROUND OF THE INVENTION

Early user interface systems presented a monolithic appearance to the user. There was no opportunity for the user to customize the appearance or functionality of the interface to match the user's preferences or needs. As windowing interfaces were developed, an early feature of such interfaces was the ability to move a particular graphical display window about the screen, with the position of the window being remembered from one session to another. As processors became more powerful, operating systems began to provide enhanced opportunities for users to select among various options, such as the font for text display and background colors or images.

Today, most high-end software tools and operating systems allow for substantial amounts of customization by the user, including such features as adding or deleting icons from toolbars, selecting the font face, style and size for text display, selecting graphical color and sharing schemes, and window/sub-window/pane size, position, and stacking order.

A complex example of such interface customization is provided by U.S. Pat. No. 6,232,968 to Alimpich, et al. '968 describes a system for controlling computer operation (specifically the management of printer systems), whereby the user selects among a variety of different sets of interactive functions for the control of multiple types of application program operations. Once the user makes choices from the available options, the user can switch between two or more different interface options for controlling each of two or more different program operations.

Interactive television (iTV) is a growing area of software development. Traditionally, creating an iTV application was a lengthy and expensive process, requiring intimate knowledge of the details of system software and hardware on the set-top boxes (STBs) on which an application would execute. For this reason, iTV applications were often designed for reuse. A template application might have replaceable resources, such as images or text content, and adjustable timing for behavior that is intended to be synchronized with particular program content. An example of such a template application is a play-along game show application, in which the questions and answers vary from week-to-week, as does the timing of presentation of the questions to the game show participants (and thus to the viewer).

A challenge in creating and using such template applications is the need to create an easy-to-use environment for refilling or redefining various placeholder aspects of the template, such as image, text and data. In some cases, the high cost of developing the application has justified the creation of a specialized data entry application specifically for filling in the content of the template for reuse. When a user loads an episodic project, it is not very obvious what item(s) need to be changed or how to change them.

As with many design and development tools, the general authoring interface is overly complex and daunting for the simpler tasks involved in filling in placeholder content when working with an application template. Therefore, there exists a need for a mechanism that provides guidance and assistance to a technician who is working with an application template in the authoring suite.

BRIEF SUMMARY OF THE INVENTION

The present invention allows a designer to specify how the environment will appear and function for an end user of the development tool. The present invention is applicable in any context where a computer-mediated task process is performed. In particular, any development environment in which data can be presented or modified through a number of different views is appropriate for this invention. Examples of such environments are the generation and modification of mailing lists in a word processing application, completion of web-page templates for website creation, or iTV applications.

The present invention provides standard or default window sets that are shipped with the product, the ability to associate a window set with an appropriate placeholder element (layout, state table, table, etc.) and to associate the desired window sets with a project. The window sets are exportable and importable to other projects and are easy to bundle with a project(s).

The present invention provides systems, methods and graphical user interfaces for creating interactive television applications. A template author creates a template application and assigns placeholder objects to display elements. An episodic creator creates an episodic application by making changes to display elements associated with a presented placeholder object.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
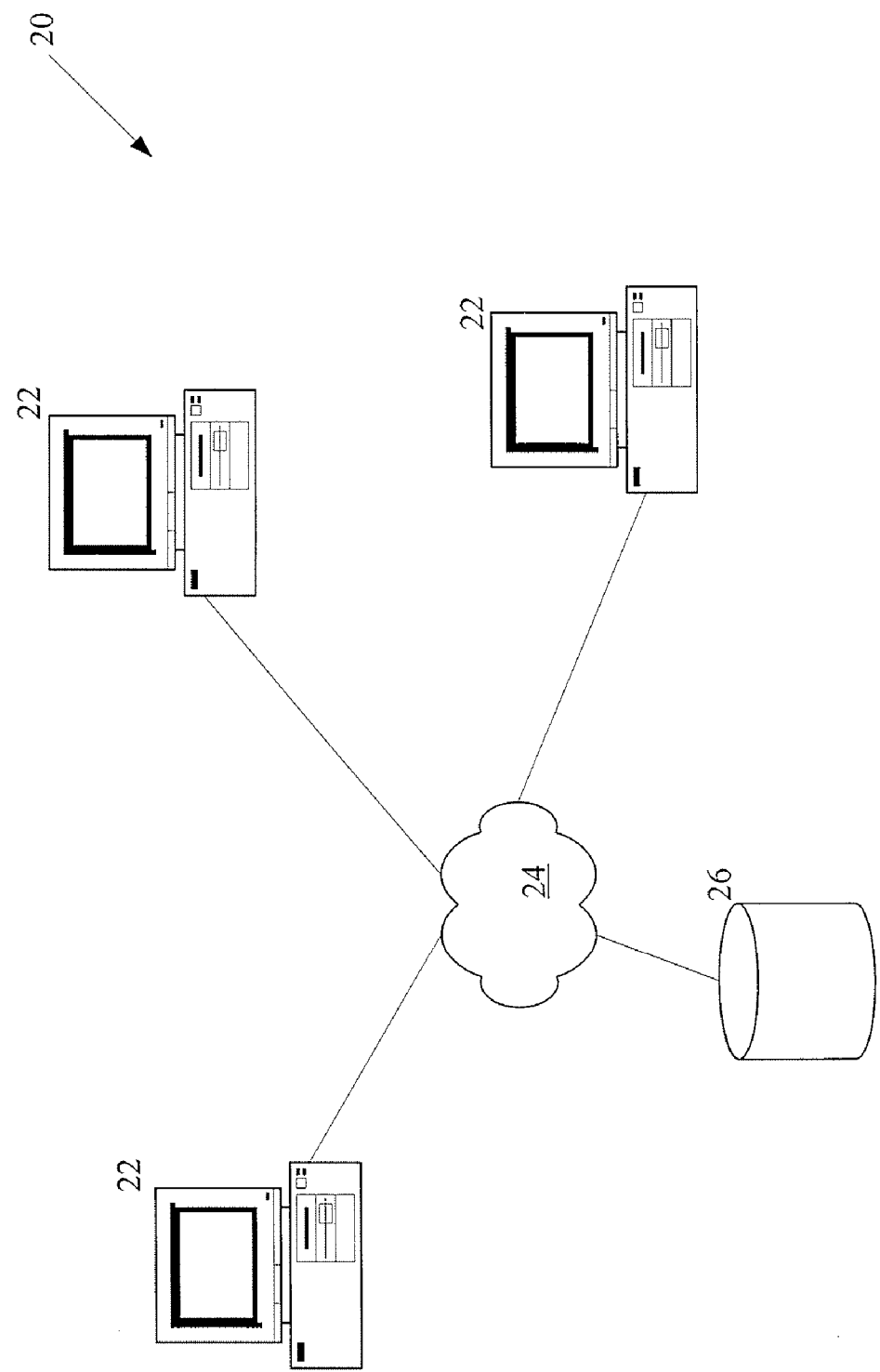
FIG. 1 is a diagram of an example system for implementing the present invention.

FIG. 1 illustrates a system 20 that includes computers 22 in communication with a storage device 26 over a public or private data network 24. The storage device 26 stores application information that is created and stored by authors and technicians using the computers 22.

When an application author develops a template application using a design tool (a graphical user interface (GUI)), a template placeholder is associated with a window set. A window set includes a subset of views that can be provided by the design tool. Each view is placed and sized as desired by the author. Window set meta-data is then associated with the application template. When the template is reused, an authoring tool (a GUI) displays the author-specified set of views with appropriate features and appearance according to the author's preferences. Examples of the GUIs are shown in FIG. 2A-G below.

In an iTV application program, a window set contains a users window configuration. The window set can be used to enhance user efficiency in completing a task or tasks. Window sets may be predefined for making basic tasks less confusing and increase usability. Also, a template author's job is made easier by allowing assignment of placeholder elements to a window set for a template project. This makes it simpler for the user who is modifying an episodic application, because the window configuration needed to make the necessary changes can automatically be shown and adjusted for easy access based on the element they have selected in the placeholders tab (in a status window), see FIG. 3A-F below.

A placeholder element is any tvscript element (i.e., object, object property, function, etc.) that can be marked for change. A placeholder list acts as a todo list. The user can mark elements that have not been finalized (graphics are a good example of this) as a placeholder and then check their placeholder list as they get updates and remove the placeholder status when final changes have been made.

A project set saves the data in the windows that are being viewed. The window configuration was stored in the registry as the current setup or saved separately in a window set. If the user changed their current window configuration and then loaded a project set, the data may not be directly available because the window that showed that information is no longer being viewed by the current window configuration. However, if the window configuration was saved with the project set information, then the window configuration for that project set will automatically display when that project set is loaded. Episodic Window sets are intended to reduce any confusion regarding what elements of an episodic project need to be updated.

Figure 2A:
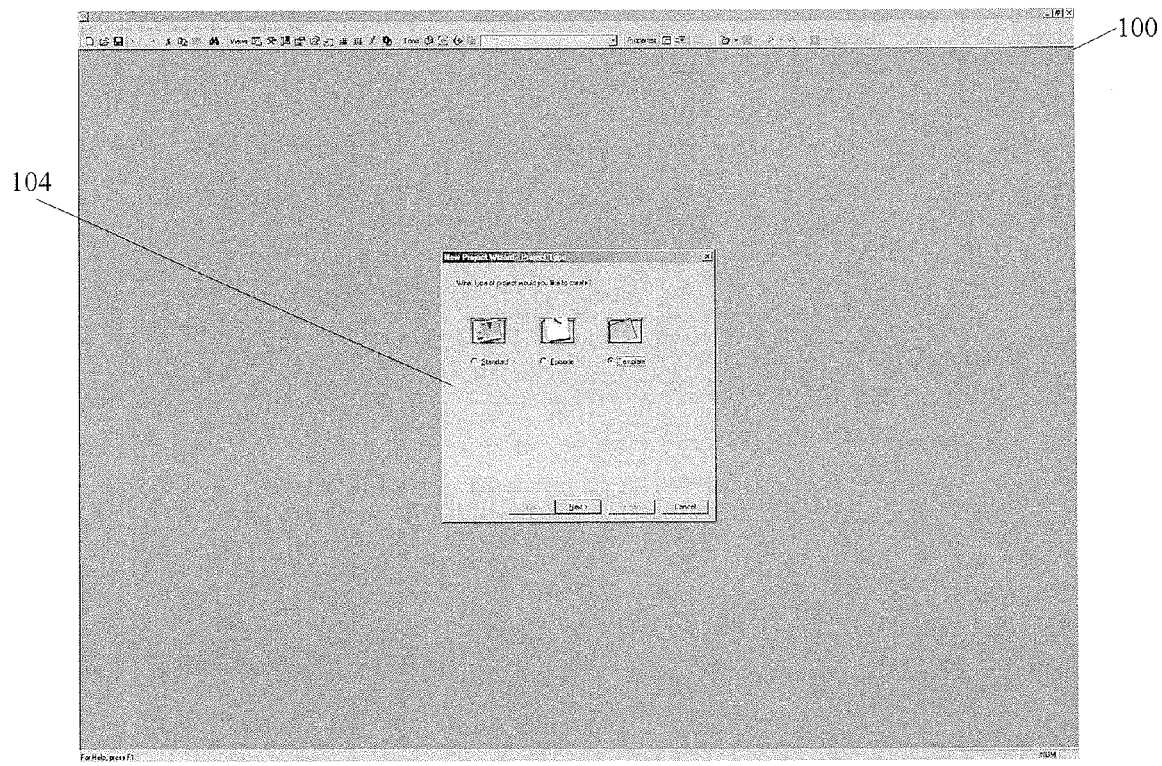
FIGS. 2A-G are screen shots of a graphical user interface executed by a system, such as that shown in FIG. 1, for performing template creation.

FIG. 2A shows a screen shot of a first page 100 of the GUI that allows the author to create template applications (window sets). The first page 100 includes a project type window 104. The project type window 104 allows a user to select between a standard project, an episode project, or a template project. The standard project is one where placeholders cannot be used to lock/unlock properties of objects. If a user makes a copy of standard project, they have full editing rights to change any aspect of it they wish.

In one embodiment, the template project may only be selected by authorized users, for example, a template author. Upon selection of the template project within the project type window 104, the GUI presents a second page 110 that includes a new project type window 112 that allows a template author to create and identify a new template, use an existing project as a starting point for a new template, or copy a stock profile or a custom profile for use in creating a new template.

Figure 2B:
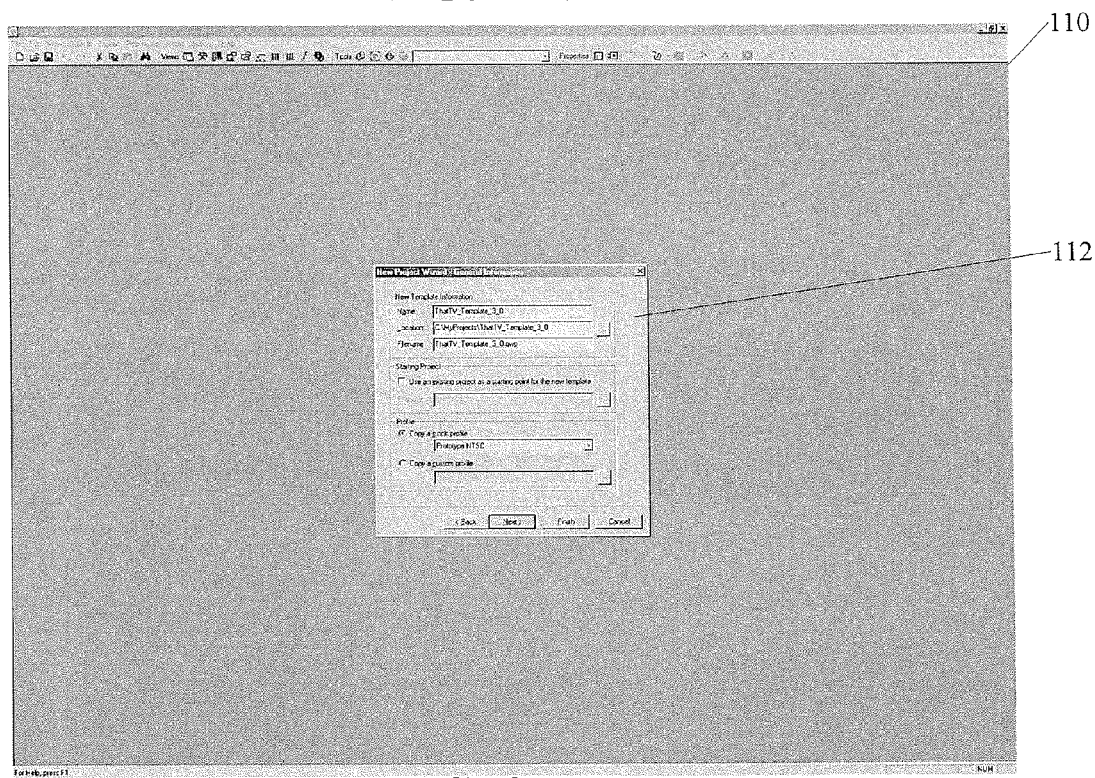
Figure 2C:
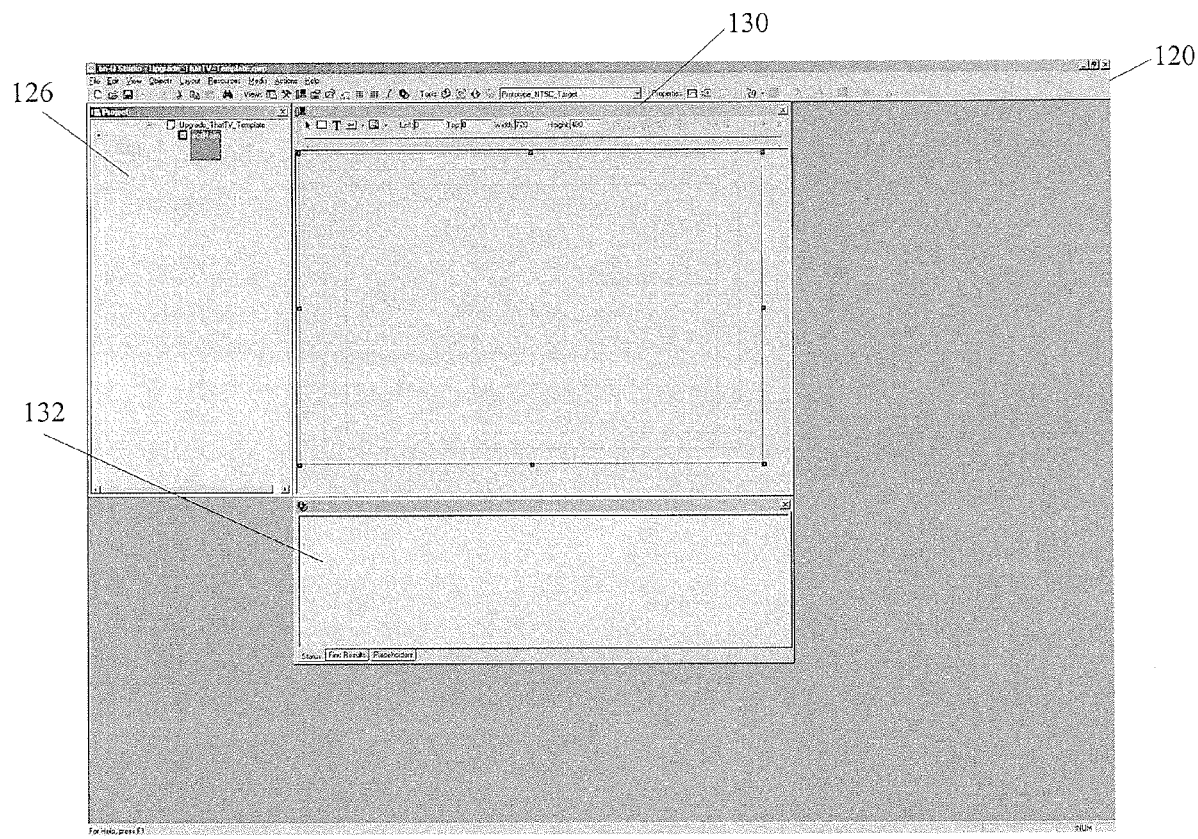

After the template name and location information has been entered in the second window 110, as shown in FIG. 2B, the GUI presents a third window 120 as shown in FIG. 2C. The third window 120 is an initial template project page that presents windows based upon the information selected at the new project type window 112. In this example, a project window 126, a lay-out window 130, and a status window 132 are presented in a work space of the page 120. In this example, nothing is presented in the windows 126-132 because the template is empty and is waiting for the author to begin interaction.

Figure 2D:
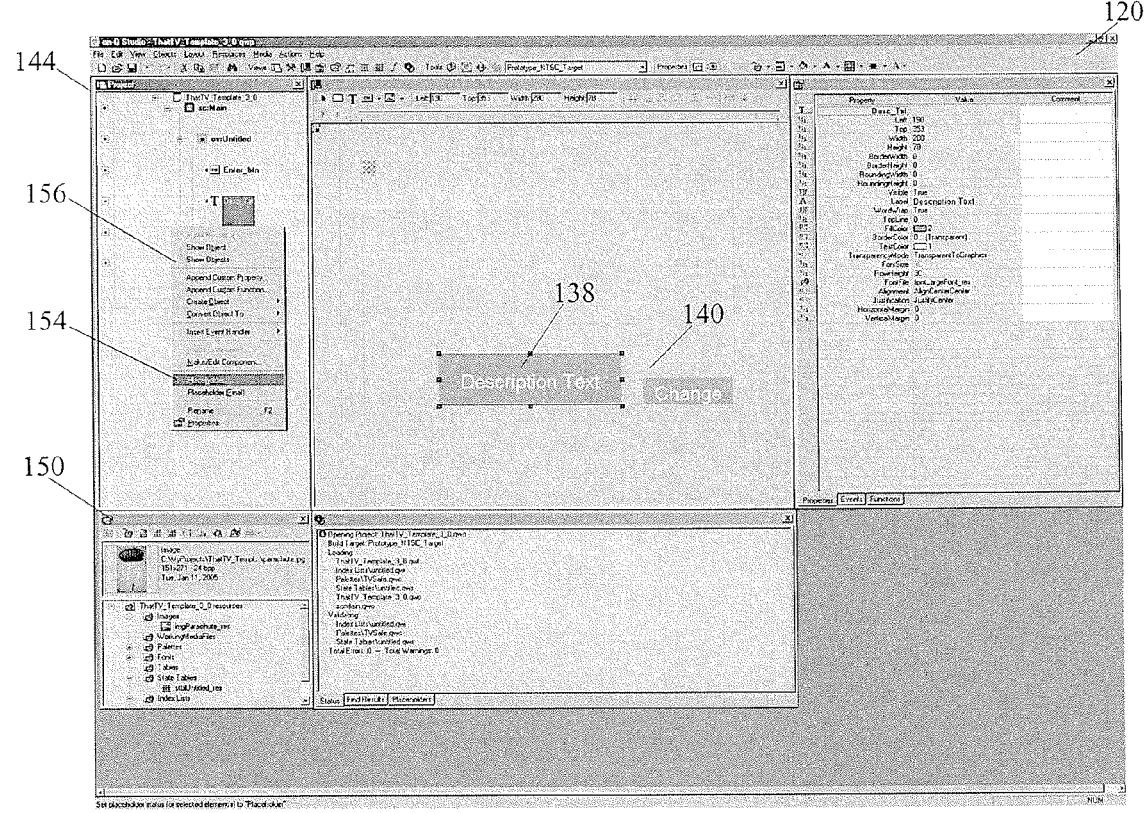

FIG. 2D illustrates the page 120 after the author has begun creating objects and has begun the process of assigning placeholders. As shown in the lay-out window 130, the author has entered two blocks: A descriptive text block 138 and a change box 140. The change box 140 is a text box object. A project view allows the viewer to see the directory structure and organization of their project. The resource bin 150 lists all the externally referenced assets used in the application. In order to change a logo graphic the viewer will need to change the graphic file—generally by right clicking on that list item in the resource bin and selecting 'replace'.

Then, the author determines what objects included in the lay-out window 130 that they will allow episode creators to edit. This is done by selecting an object, such as the selection of the descriptive text block 138 as shown, then selecting a placeholder function 154 from a pull-down or pop-up menu 156. Selection of the placeholder function 154 allows the descriptive text box 138 to be editable by an episode creator and thus will appear in a placeholder list to that creator. Right click on the list item in the project view window.

Figure 2E:
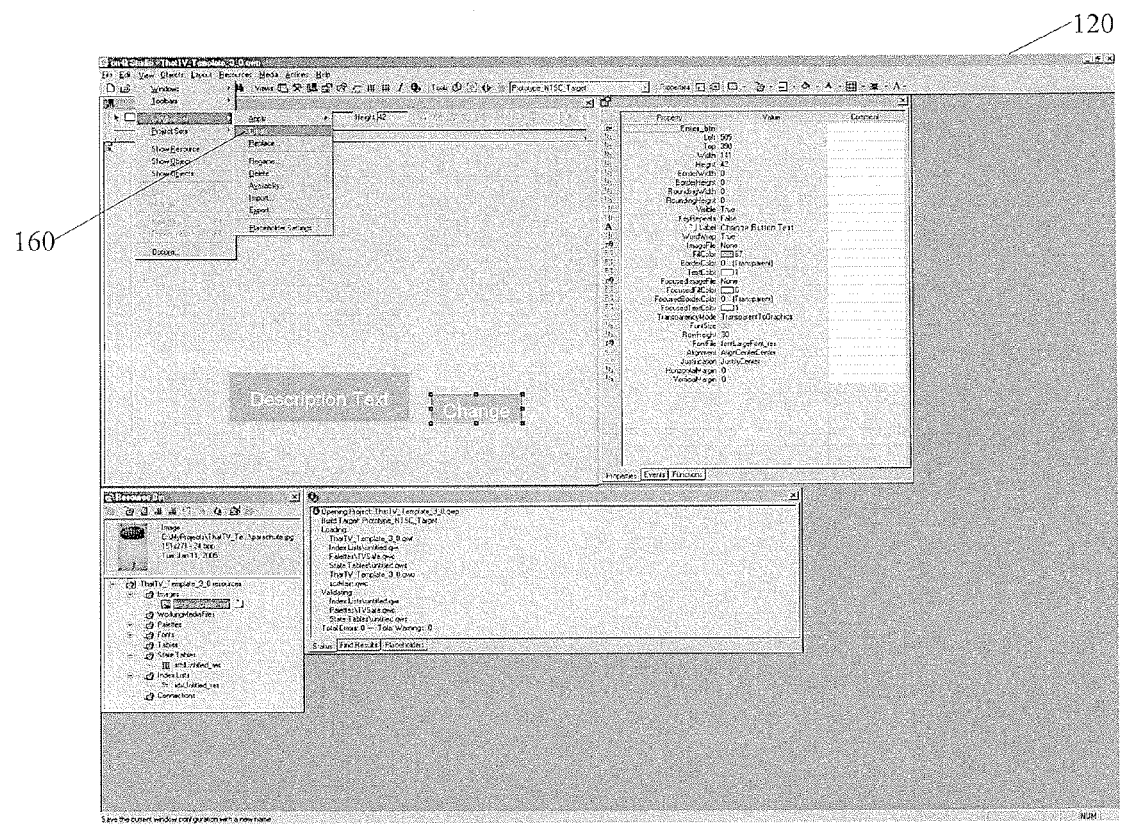
Figure 2F:
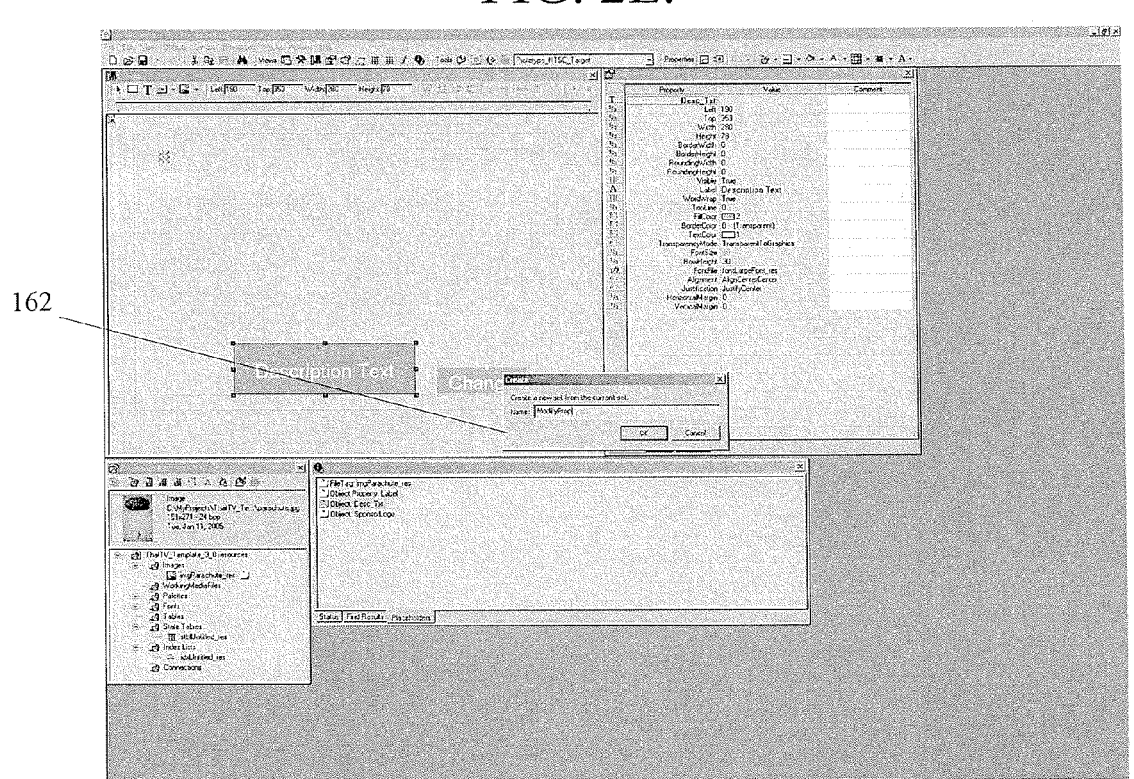

FIGS. 2E and 2F illustrate saving what was created in FIG. 2D as a window set by activating a window set creation function 160 as activated from the pull-down menu of the menu bar of the window 120. Then, a naming window 162 is presented, as shown in FIG. 2F, in order to allow the author to name the present window set.

Figure 2G:
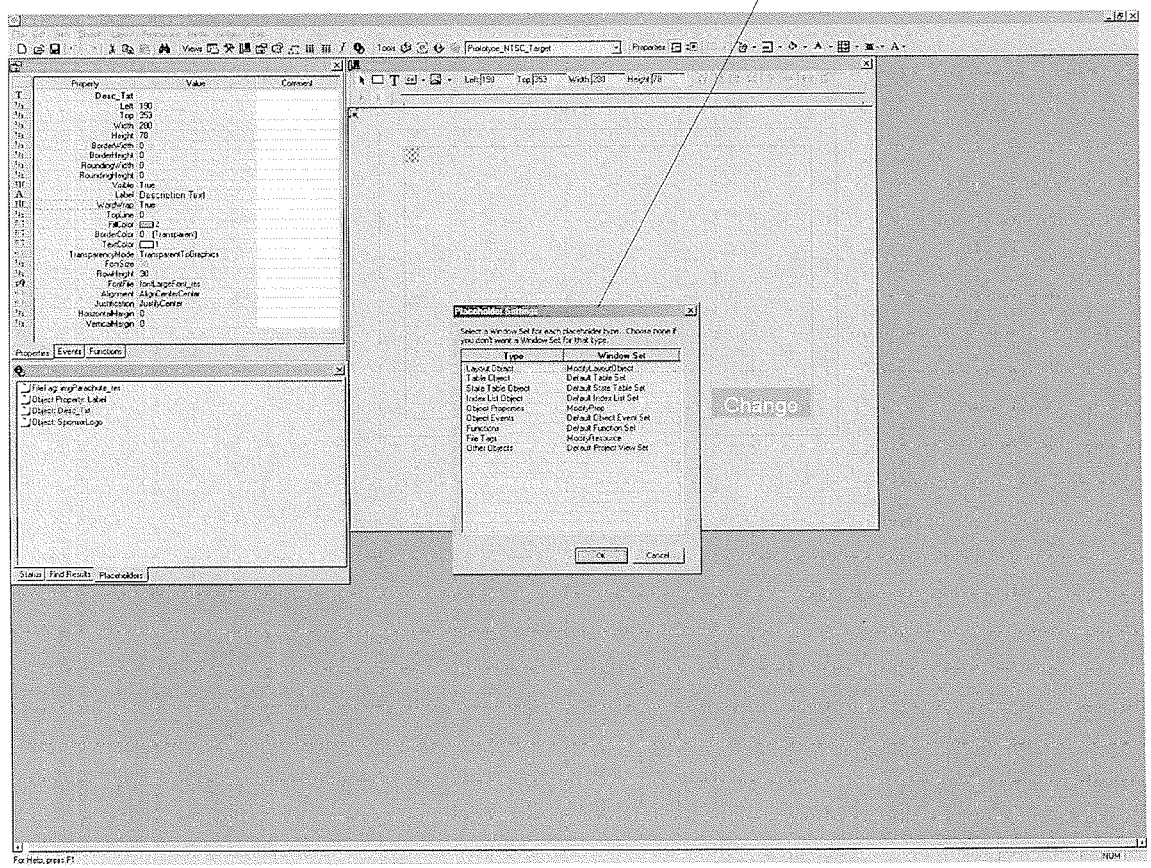

FIG. 2G shows a placeholder settings window 168. There is a default window configuration for each object type. So one sets the customer configuration for that particular object. The placeholder is the object's status—a parameter setting—and does not represent anything outside of that parameter. The author assigns the object as a placeholder, the author then assigns a window set configuration to that object.

Figure 3A:
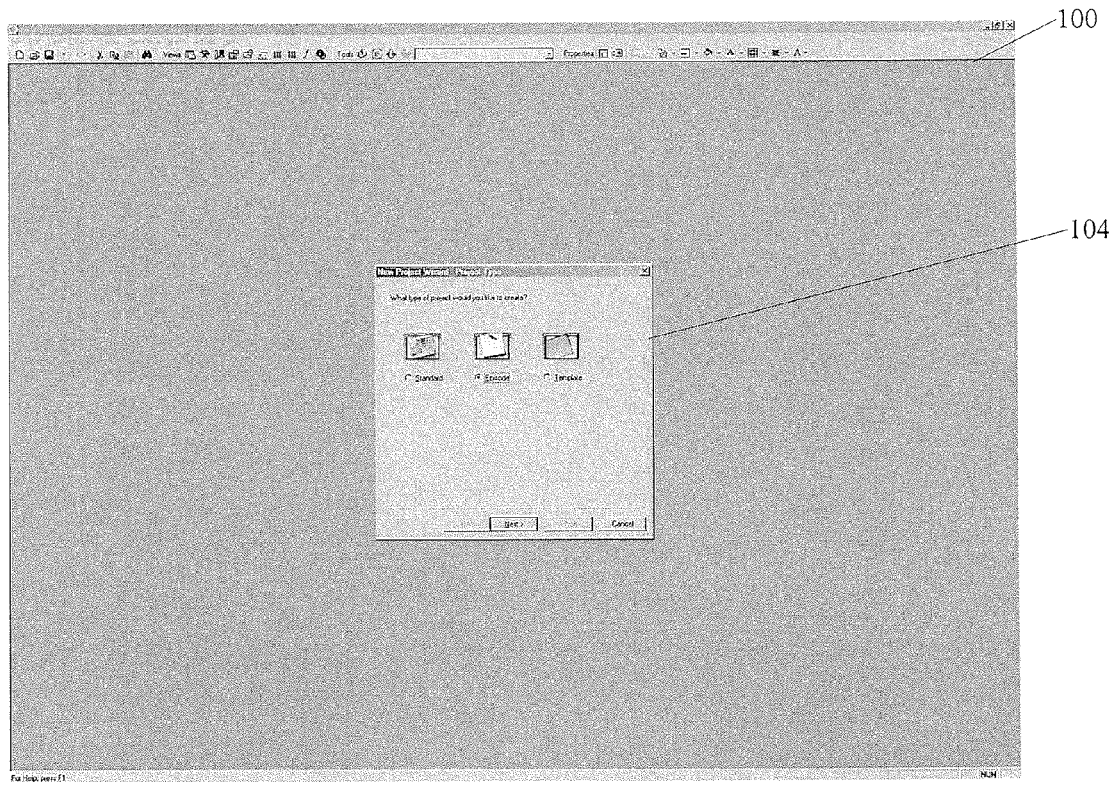
FIGS. 3A-F are screen shots of a graphical user interface executed by a system, such as that shown in FIG. 1, for performing episodic project creation.
Figure 3B:
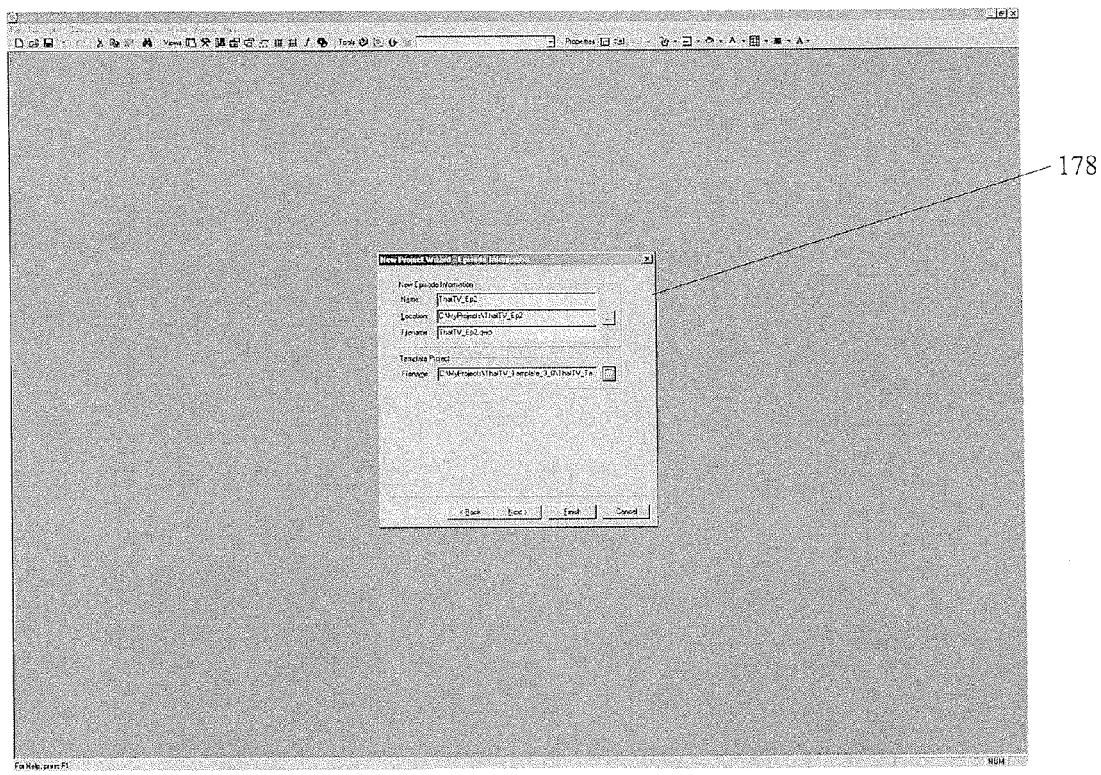

FIG. 3A shows that an episodic creator has select an episode project in the project type window 104. This presents the creator with a new project window 178 as shown in FIG. 3B. The creator enters new episode information and the filename of the template project into the new project window 178.

Figure 3C:
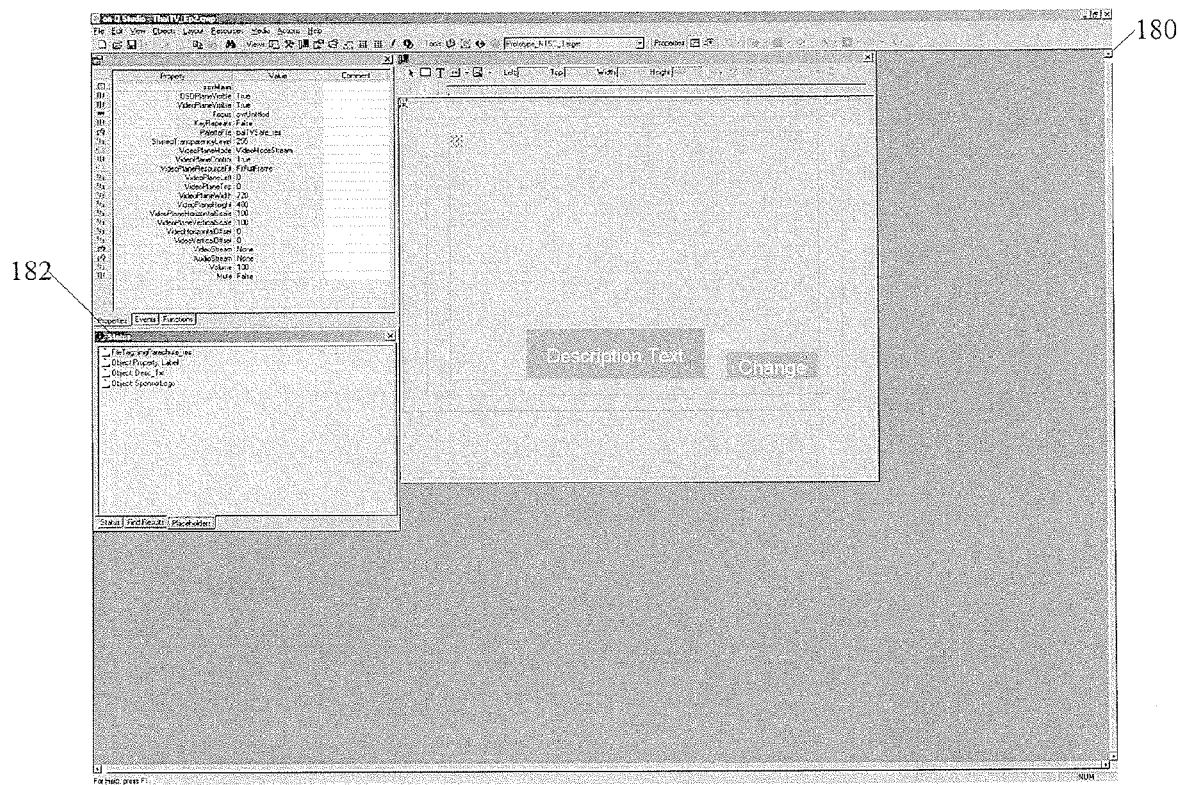

As shown in FIG. 3C, the episodic creator can view the placeholder types within a status window 182 of an episodic creation page 180. The user selects from any one of the placeholder types within the status window 182 in order to edit an associated element. The objects in the layout window appear after the user has double clicked on the list item in the project view.

Figure 3D:
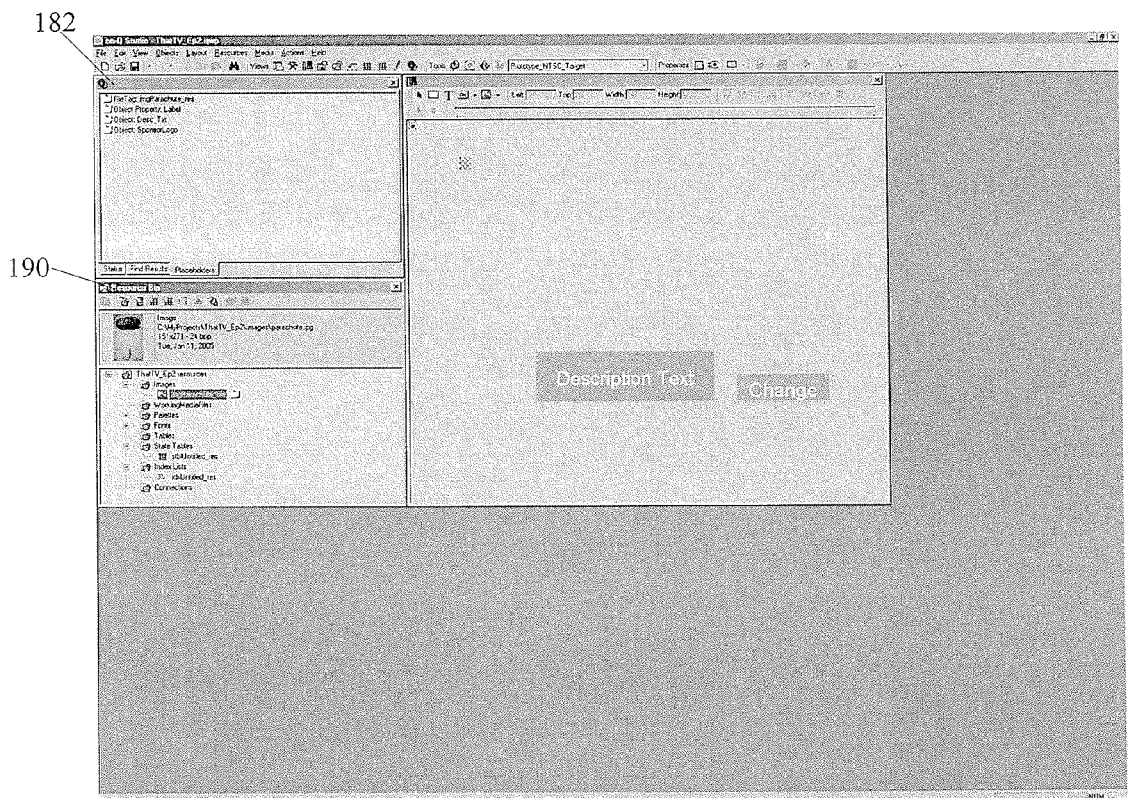

FIG. 3D illustrates that a resource bin window 190 is presented to the episodic creator after the user has selected the file tag placeholder. The resource bin window 190 allows the user to view features of the selected placeholder and make any changes to that element. The resource bin allows the user to change the graphical asset used in that object.

Figure 3E:
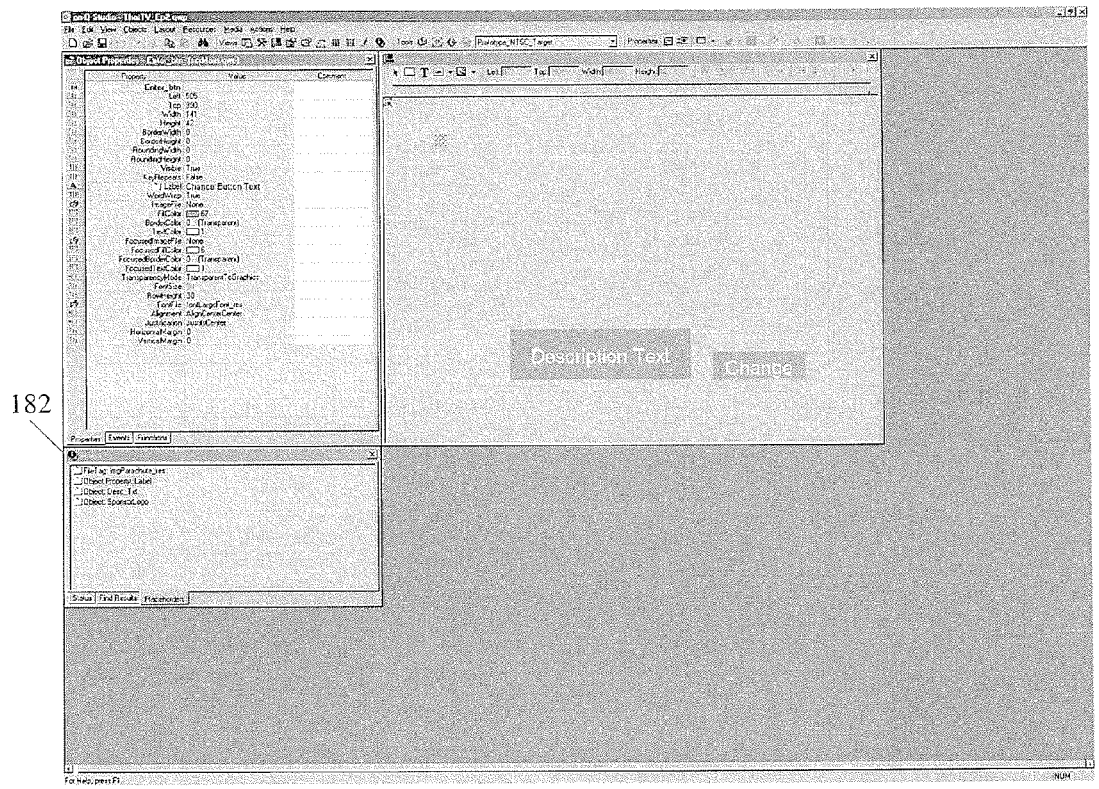

FIG. 3E illustrates an object properties window 184 that is presented to the creator upon selection of an object property label placeholder from the status window 182. The object properties window 184 allows the user to change object properties such as background color, font alignment, position on screen. Essentially any property that has been identified by the template author as a property which may be changed.

Figure 3F:
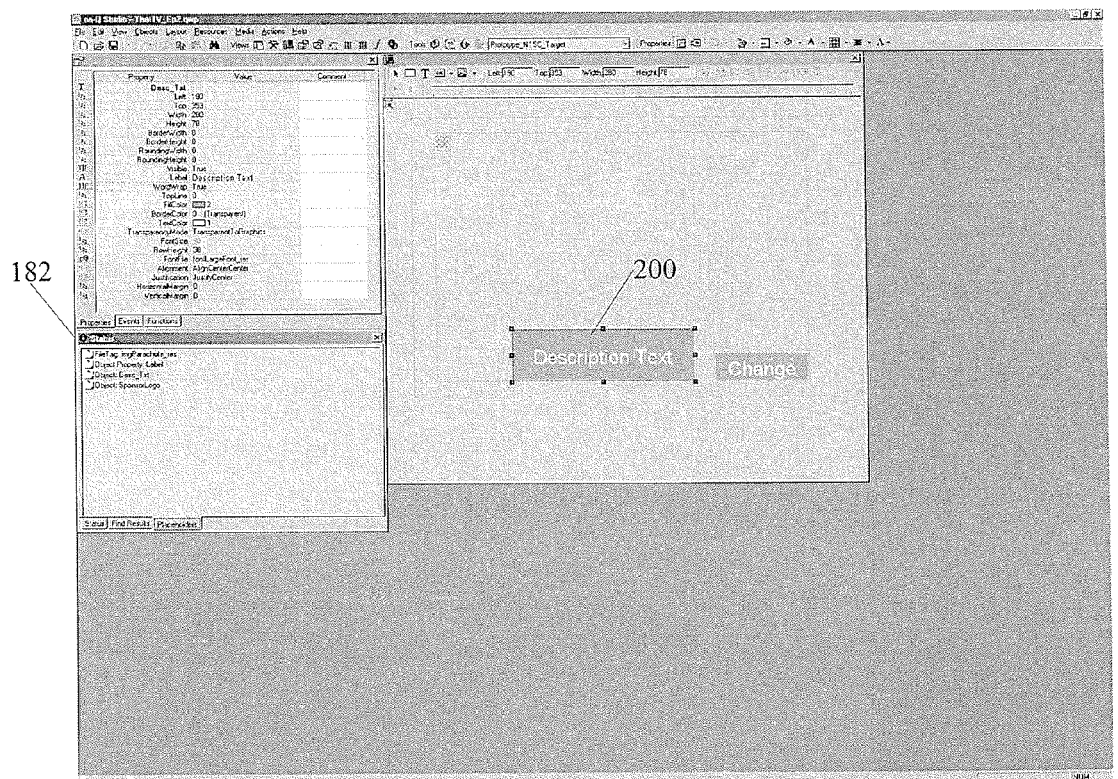

FIG. 3F illustrates that the description text box 200 is editable by the episode creator after the creator has selected the object desc_txt placeholder from the status window 182. Only those defined as template authors can change any feature of a placeholder object.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for creating interactive television applications, the system comprising:
   a template author system comprising:
      a display;
      a user interface; and
      a processor coupled to the display and the user interface, the processor comprising:
         a component for presenting a layout window on the display;
         a component for assigning one or more display elements to the layout window using the user interface;
         a component for assigning a placeholder object to at least one of the display elements using the user interface; and
         a component for saving the assigned display elements and placeholder object as a template application; and
   a episodic creator system comprising:
      a display;
      a user interface; and
      a processor coupled to the display and the user interface, the processor comprising:
         a component for presenting a saved template application on the display;
         a component for presenting previously assigned placeholder objects and display elements on the display;
         a component for selecting a placeholder object using the user interface;
         a component for recording changes to one of the display elements that is associated with the selected placeholder object; and
         a component for saving the display elements as an episode application.

2. The system of claim 1, wherein the episodic creator system further comprises a component for updating status of the presented placeholder objects based on recorded changes to the display elements.

3. The system of claim 1, wherein the components of the episodic creator system and the template author system are distributed across a network.

4. A graphical user interface (GUI) residing on a computer-readable medium for creating interactive television applications, the GUI comprising:
   a template author component comprising:
      a component for presenting a layout window;
      a component for assigning one or more display elements to the layout window;
      a component for assigning a placeholder object to at least one of the display elements; and
      a component for initiating saving the assigned display elements and placeholder object as a template application; and
   a episodic creator component comprising:
      a component for presenting a saved template application;
      a component for presenting previously assigned placeholder objects and display elements;
      a component for selecting a placeholder object;
      a component for recording changes to one of the display elements that is associated with the selected placeholder object; and
      a component for initiating saving the display elements as an episode application.

5. The graphical user interface of claim 4, wherein the episodic creator component further comprises a component for updating status of the presented placeholder objects based on recorded changes to the display elements.

* * * * *